United States Patent
Chiesi et al.

(10) Patent No.: US 9,562,791 B2
(45) Date of Patent: Feb. 7, 2017

(54) MEASUREMENT SYSTEM OF THE RELATIVE POSITION BETWEEN TWO SEPARATE STRUCTURAL PARTS

(71) Applicant: HENESIS S.R.L., Parma (IT)

(72) Inventors: Lorenzo Chiesi, Castelnovo di Sotto (IT); Luca Mussi, Parma (IT); Matteo Sacchi, Correggio (IT); Federico Sassi, Poviglio (IT); Luca Ascari, Parma (IT)

(73) Assignee: CAMLIN ITALY S.R.L., Parma (IT)

( * ) Notice: Subject to any disclaimer, the term of this patent is extended or adjusted under 35 U.S.C. 154(b) by 0 days.

(21) Appl. No.: 14/434,136

(22) PCT Filed: Oct. 17, 2013

(86) PCT No.: PCT/IB2013/059423
§ 371 (c)(1),
(2) Date: Apr. 8, 2015

(87) PCT Pub. No.: WO2014/060986
PCT Pub. Date: Apr. 24, 2014

(65) Prior Publication Data
US 2015/0292906 A1    Oct. 15, 2015

(30) Foreign Application Priority Data
Oct. 17, 2012   (IT) .............. PR2012A0066

(51) Int. Cl.
*G01N 27/72*  (2006.01)
*G01R 33/02*  (2006.01)
(Continued)

(52) U.S. Cl.
CPC ............ *G01D 5/145* (2013.01); *G01B 7/003* (2013.01)

(58) Field of Classification Search
CPC ............................ G01D 5/145; G01B 7/003
(Continued)

(56) References Cited

U.S. PATENT DOCUMENTS 6,731,108 B2   5/2004  Zalunardo et al.
8,970,210 B2   3/2015  Masson et al.
(Continued)

FOREIGN PATENT DOCUMENTS

EP   1243897 A1   9/2002
EP   2159546 A2   3/2010
(Continued)

OTHER PUBLICATIONS

Melexis, "Triaxis TM Hall Sensor MLX90316", Jun. 26, 2007, XP002689281, pp. 1-37.
(Continued)

*Primary Examiner* — Farhana Hoque
(74) *Attorney, Agent, or Firm* — Pearne & Gordon LLP

(57) ABSTRACT

A measurement system (1) of the relative position between two structural parts (2a, 2b) of a building, that have separated for example following the formation of a crack, comprising a cylindrical permanent magnet (3) adapted to generate a magnetic field (B) and a sensor (5), the sensor (5) being fixed and the magnet (3) being moveable according to a direction perpendicular to its axis of symmetry (h) so as to vary the direction of the lines of force of the magnetic field B which cross the sensor 5.

14 Claims, 6 Drawing Sheets

(51) Int. Cl.
*G01D 5/14* (2006.01)
*G01B 7/00* (2006.01)

(58) Field of Classification Search
USPC .................................. 324/207.25, 225, 244
See application file for complete search history.

(56) References Cited

U.S. PATENT DOCUMENTS

2002/0167306 A1  11/2002  Zalunardo et al.
2012/0262162 A1* 10/2012  Masson .................. G01D 5/145
                                                        324/207.25

FOREIGN PATENT DOCUMENTS

WO    2011055064 A2    5/2011
WO    2012025763 A1    3/2012

OTHER PUBLICATIONS

Melexis, "Product Information MLX90333 Absolute Position Sensor IC", May 12, 2011, XP002689282, pp. 1-2.

* cited by examiner

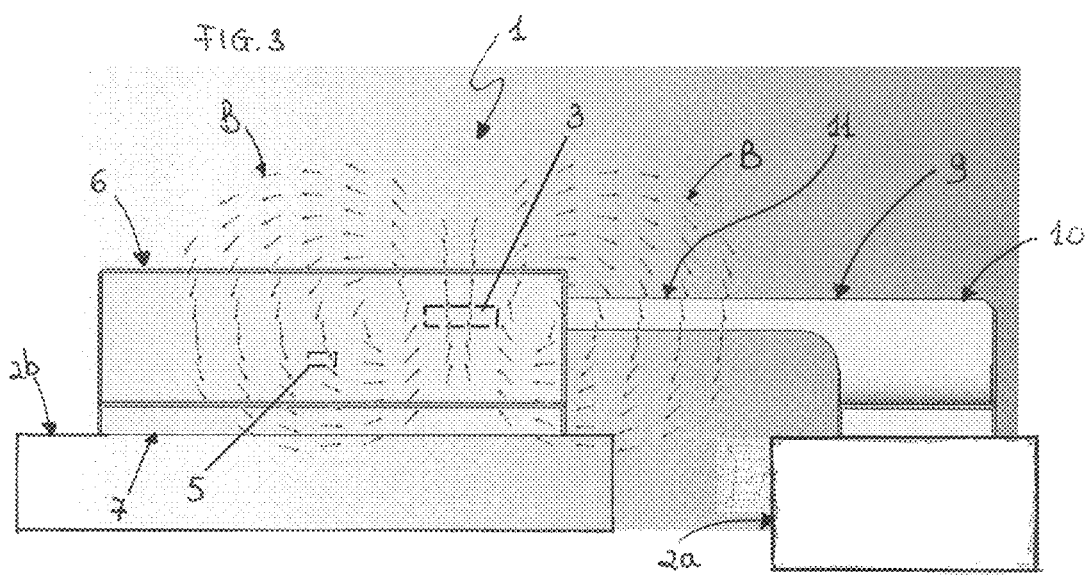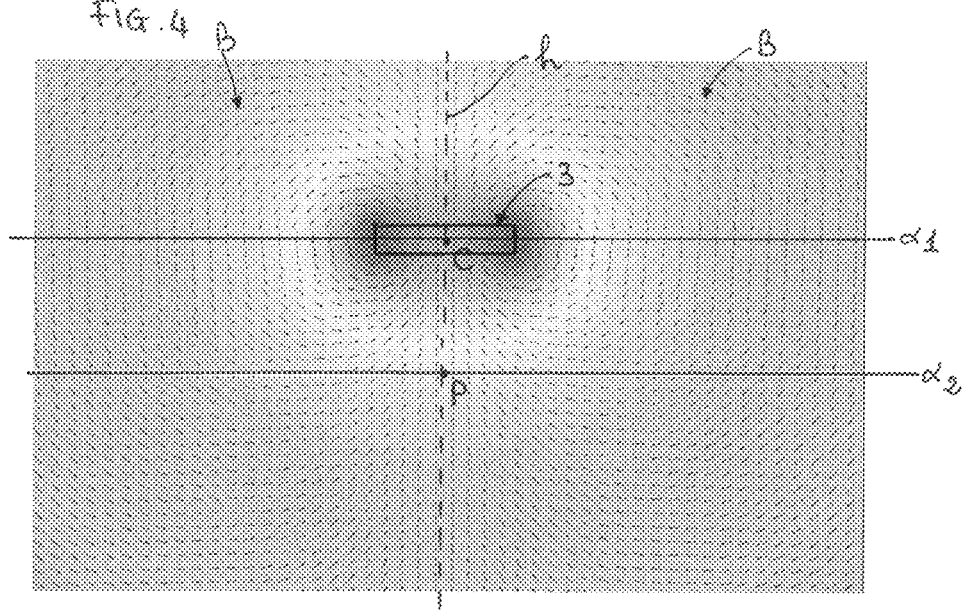

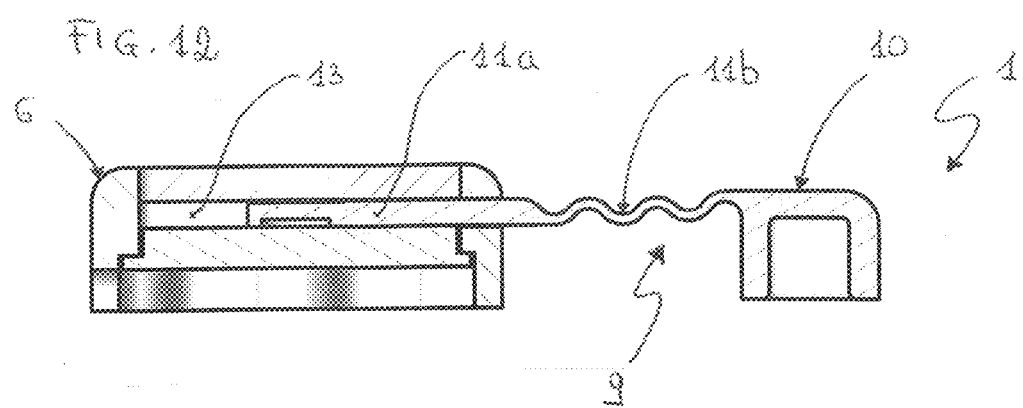

MEASUREMENT SYSTEM OF THE RELATIVE POSITION BETWEEN TWO SEPARATE STRUCTURAL PARTS

TECHNICAL FIELD

The present invention relates to a measurement system of the relative position between two separate structural parts. In particular, such a system is used for the measurement of the relative position between two structural parts of a building or a masonry work that have separated following the formation of a crack.

From document WO2012/025763 a monitoring system of the relative shift between two separate structural parts is known based on the measurement of the precise intensity of the magnetic field generated by a permanent magnet. Such a system is formed by a cylindrically shaped magnet applied to a structural part of a building and one or more Hall-effect sensors fixed to the structural part in order to measure the intensity of the magnetic field generated by the magnet. If the sensors are positioned in the magnetic field so as to be crossed perpendicularly by the flow lines, the intensity of the magnetic field is inversely proportional to the square of the distance from the magnet ("Coulomb's law" for magnets). Therefore, the distance can be easily calculated as the square root of the inverse of the magnetic field. The precise intensity of the magnetic field measured by each sensor is therefore converted into a distance. Through triangulation it is therefore possible to calculate the two- or three-dimensional position of the magnet with respect to the sensors.

The main drawback of the solution just illustrated lies in the need to perform the precise measurement of the intensity of the magnetic field, which is usually variable over time due to the temperature and ageing of the permanent magnet.

Another drawback is connected with the fact that Coulomb's law for magnets is only applicable if the sensors are positioned in such a way as to be crossed perpendicularly by the flow lines of the field.

A further drawback is connected with the large dimensions and cost due to the need to use a plurality of sensors.

Another drawback is due to the need to perform the triangulation, which implies intrinsic precision drawbacks.

Another limit to the solutions currently known is connected with the difficulty to monitor non-planar movements of the cracks.

A further limit lies in the fact that the measurements performed with the known solutions do not make it possible to show whether the variation of a crack has occurred in conjunction with mechanical stress.

In this context, the technical task underpinning the present invention is to provide a measurement system of the relative position between two separate structural parts, for example of a building, which obviates the drawbacks of the prior art cited above.

In particular, an object of the present invention is to provide a measurement system of the relative position between two separate structural parts that is more compact, simple and cheap with respect to the solutions of the prior art.

Another object of the present invention is to provide a measurement system of the relative position between two separate structural parts, which is more precise and employable in a larger measurement field with respect to the solutions of the known art.

Another object of the present invention is to make available a measurement system of the relative position between two separate structural parts, which can sustain non-planar deformations without breaking.

A further object of the present invention is to provide a measurement system of the relative position between two separate structural parts, which makes it possible to show whether the variation of a crack has occurred in conjunction with mechanical stress.

The specified technical objective and the set aims are substantially attained by a measurement system of the relative position between two separate structural parts, comprising the technical characteristics set down in one or more of the appended claims.

Further characteristics and advantages of the present invention will more fully emerge from the non-limiting description of a preferred but not exclusive embodiment of a measurement system of the relative position between two separate structural parts, as illustrated in the accompanying drawings, in which:

FIG. 3 illustrates the system of FIG. 1, in a lateral view;

FIG. 4 illustrates the lines of force generated by a permanent magnet used in the system of FIG. 1, in a sectional view;

FIG. 12 illustrates the system of FIG. 9, in a sectional lateral view.

Figure 1:
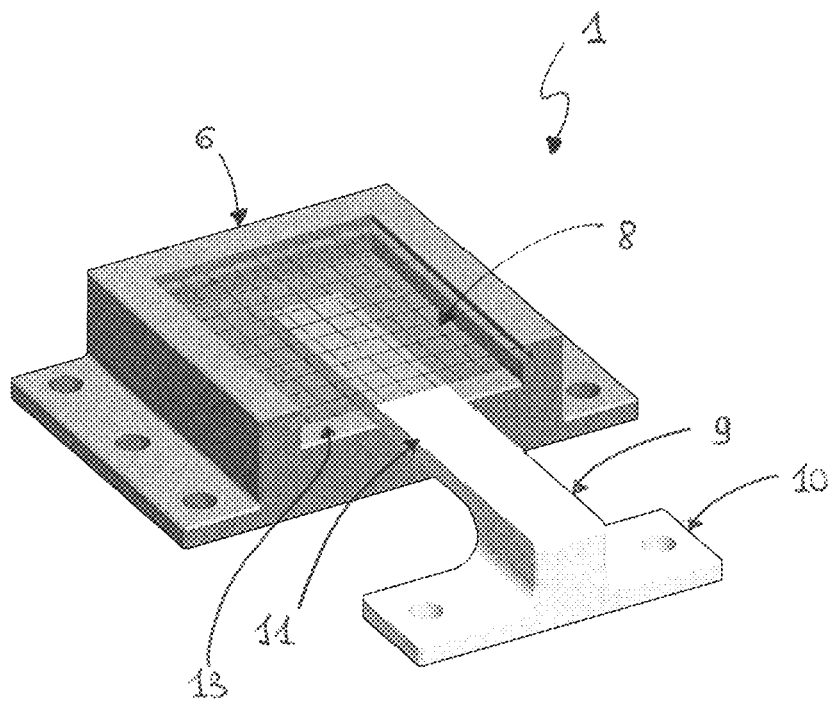
FIG. 1 illustrates a measurement system of the relative position between two separate structural parts, according to the present invention, in a perspective view.

With reference to the figures, number 1 indicates a measurement system of the relative position between two separate structural parts 2a, 2b. For example, the measurement system 1 is used on the structural parts 2a, 2b of a building, that have separated following the formation of a crack.

The measurement system 1 comprises a body 3 adapted to generate a magnetic field B. Such a body 3 is applicable to one of the structural parts 2a. In particular, the magnetic field B generated has cylindrical symmetry. In the embodiment described and illustrated herein, the body 3 is a cylindrically shaped permanent magnet. For example, it is a cylindrically shaped neodymium permanent magnet, having a height of 2 mm and a diameter of 10 mm. Alternatively, the body 3 is an electromagnet.

On the other structural part 2b a sensor 5 is applicable. Preferably, it is a triaxial Hall-effect sensor.

Originally, the sensor 5 and the body 3 (in this embodiment the permanent magnet 3) can be moved according to a direction perpendicular to the axis of symmetry h of the magnetic field B so as to vary the direction of the lines of force of the magnetic field B which cross the sensor 5. In the event of a cylindrical permanent magnet 3 the axis of symmetry h of the magnetic field B coincides with the axis of symmetry of the permanent magnet 3.

FIG. 4 shows the intensity and direction of the flow of the magnetic field B generated by the neodymium permanent magnet 3, having a cylindrical shape with a height of 2 mm and diameter of 10 mm. Considering a first plane α1 parallel to the flat faces of the magnet 3, i.e. perpendicular to the axis of symmetry h, and passing through the centre C of the magnet 3, it can be noted that the flow of the magnetic field B has a perfectly vertical direction everywhere.

If, on the other hand, a second plane α2 is considered, still perpendicular to the axis of symmetry h but placed at a different height, i.e. not passing through the centre C of the magnet 3, it can be observed that the flow direction of the magnetic field B changes according to where it is. In particular, the flow has a vertical direction only exactly below the centre C of the magnet 3. Moving away from the centre C of the magnet 3, the direction of the flow undergoes a rotation until it becomes perfectly horizontal. Beyond the horizontality point, the direction inverts by continuing to rotate becoming vertical again (but only asymptotically at an infinite distance).

The flow intensity of the magnetic field B on the second plane α2 enjoys radial symmetry with respect to the meeting point P of the second plane α2 with the axis of symmetry h.

At every point on the second plane α2, the magnetic field B can be broken down into a radial component Br, lying on the plane α2, and a vertical component Bz, parallel to the axis of symmetry h.

The radial component Br is, in turn, obtained by the Pythagorean composition of two planar components Bx, By, according to the relationship:

$$Br = \sqrt{Bx^2 + By^2} \quad (1)$$

Figure 5:
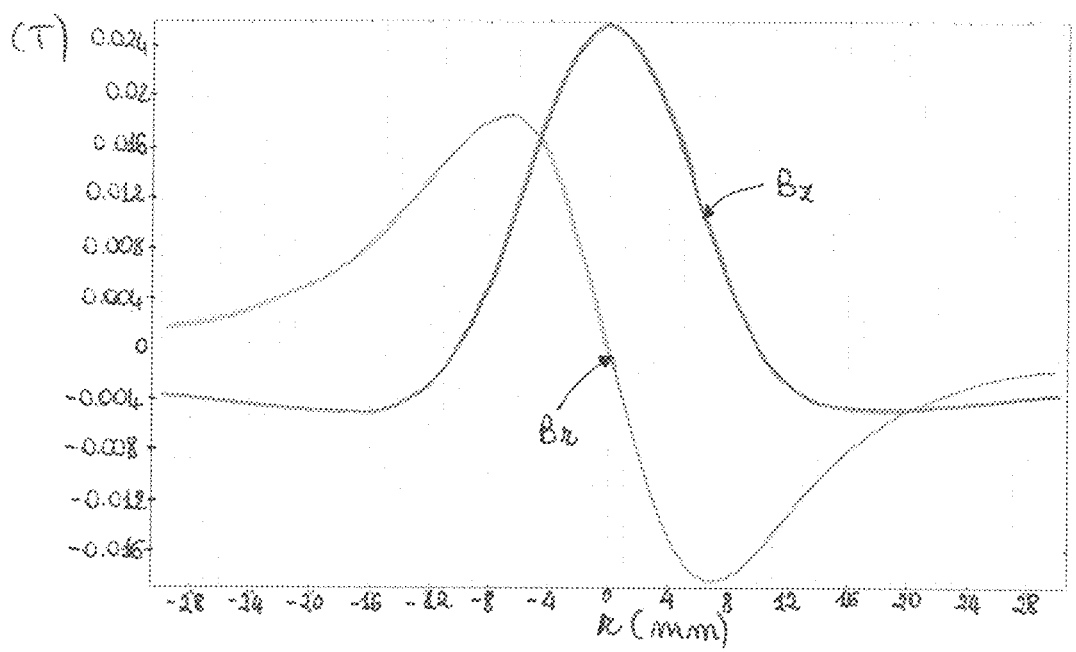
FIGS. 5 to 7 are graphs relating to the trend of some physical sizes used in the system of FIG. 1.

FIG. 5 illustrates the intensity trends of the radial component Br and of the vertical component Bz for each point of the flow of the magnetic field B according to the distance r from the point P placed on the axis of symmetry h. FIG. 5 confirms that the vertical component Bz changes sign beyond a certain distance r from the axis of symmetry h, while the planar component Br always points towards the magnet 3. As is known, the relationship between the radial component Br and the vertical component Bz is equal to the tangent of the angle θ comprised between the direction of the magnetic field B and the vertical component Bz. Therefore, the following formula is valid:

$$\frac{Br}{Bz} = \tan\theta \quad (2)$$

It is therefore possible to measure the angle θ comprised between the direction of the magnetic field B and the vertical component Bz through the following equation:

$$\theta = \arctan\left(\frac{Br}{Bz}\right) \quad (3)$$

Figure 6:
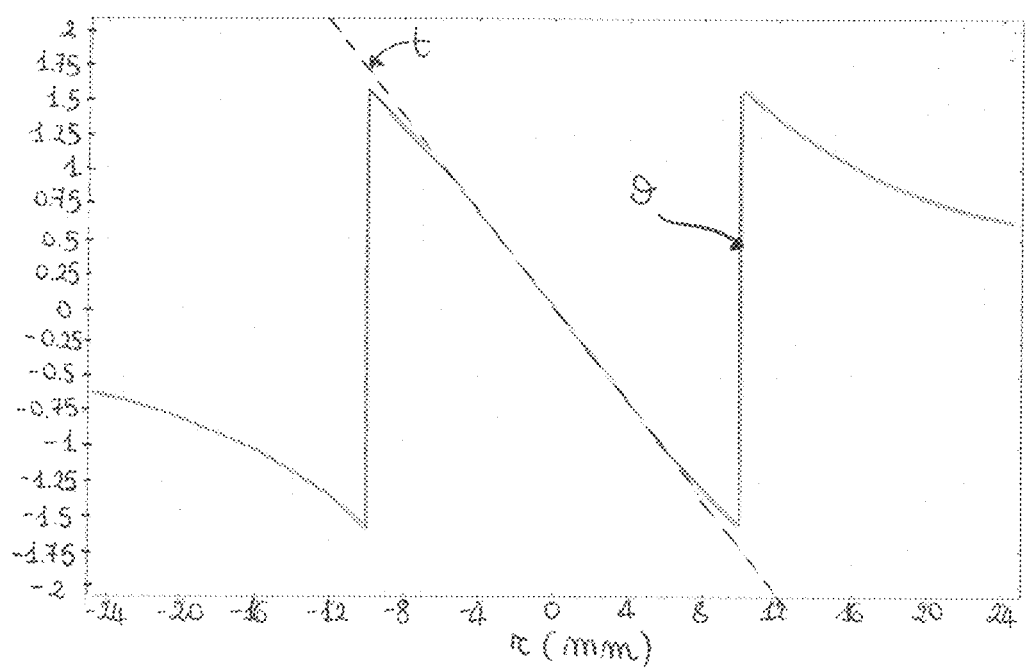

The trend of the angle θ comprised between the direction of the magnetic field B and the vertical component Bz according to the distance r from the axis of symmetry h is shown in FIG. 6. The fact that the trend of the angle θ can be estimated quite well with a straight line t suggests the existence of an almost linear relationship between the distance r from the axis of symmetry h of the magnet 3 and said angle θ, i.e. it is possible to write:

$$r \propto \arctan\left(\frac{Br}{Bz}\right) \quad (4)$$

Originally, the sensor 5 is configured to measure three vector components Bx, By, Bz of the intensity of the magnetic field B.

To determine the coordinates (x,y) it is sufficient to apply the following formulae:

$$x = r\frac{Bx}{Br} \quad (5)$$

$$y = r\frac{By}{Br} \quad (6)$$

The measurement system 1 comprises a processing block of the three vector components Bx, By, Bz measured by the sensor 5. This processing block is configured to calculate at least the radial component Br according to the relationship (1) and the distance r from the axis of symmetry h according to the relationship (4). The processing block is a microcontroller of the known type.

In the embodiment described and illustrated herein, the sensor 5 is fixed, i.e. integral with the second plane α2, while the magnet 3 moves according to a direction perpendicular to its axis of symmetry h so that the sensor 5 is hit by the lines of force of the magnetic field B which change direction. In an alternative embodiment (not illustrated), the magnet 3 is fixed while the sensor 5 is free to move.

The use of the relationship (4) does however imply some limitations. Above all the vertical component Bz decreases moving away from the axis of symmetry h until it reaches zero and changes sign. This causes an asymptote in the relationship between the radial component Br and the vertical component Bz, which limits the field of application of the relationship (4).

Furthermore, as illustrated in FIG. 6, the relationship (4) introduces an approximation error which increases closer to the asymptotes.

On a practical level, the range of use of the relationship is of the same magnitude as some physical characteristics of the system, such as the diameter of the magnet 3 and the vertical distance of the measurement point from the magnet 3. In particular, for the situation described and illustrated herein, the acceptable measurement range is about 8 mm.

In order to solve the problems cited above, a different numerical approach has been developed.

This envisages estimating the distance r starting from the measurement of the radial component Br and of the vertical component Bz through a polynomial relationship whose coefficients can be derived from the fitting of experimental data (or potentially obtained through finite element simulations).

Figure 7:
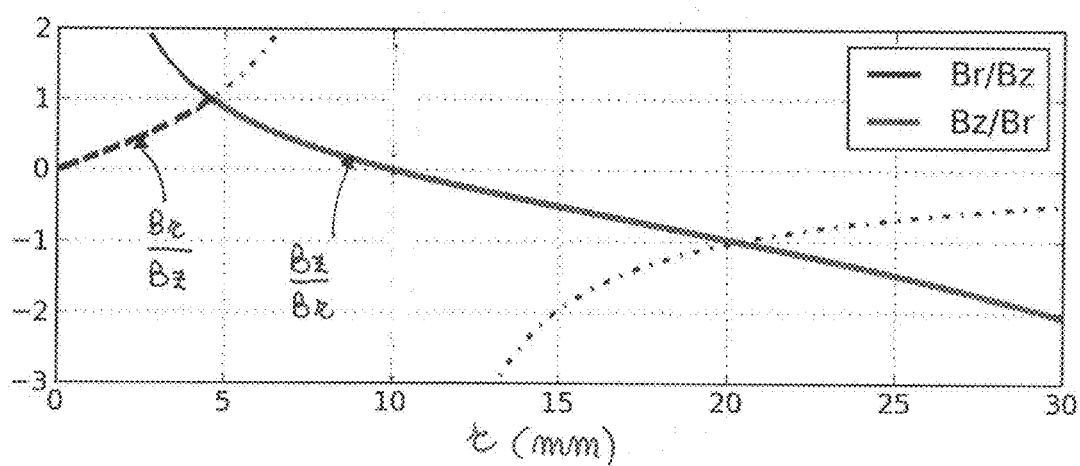

In particular, to work with treatable numerical values, avoiding the asymptotes of the relationship between the radial component Br and the vertical component Bz, it is possible to divide the fitting into two separate sections by using the relationship between said components only for a first section (illustrated with a broken line in FIG. 7) and then moving onto the inverse relationship, i.e. the relationship between the vertical component Bz and the radial component Br, illustrated with an unbroken line in FIG. 7. For example, the following formula can be used:

$$r = \begin{cases} f1\left(\frac{Br}{Bz}\right) se \frac{Br}{Bz} \in [0, 1] \\ f2\left(\frac{Br}{Bz}\right) \text{otherwise} \end{cases} \quad (7)$$

For example, f1 is a third-order polynomial and f2 is a fifth-order polynomial. Alternatively, f1 and f2 are polynomials of other orders.

In this case, the processing block uses the relationship (7) for calculating the distance r from the axis of symmetry h.

Figure 2:
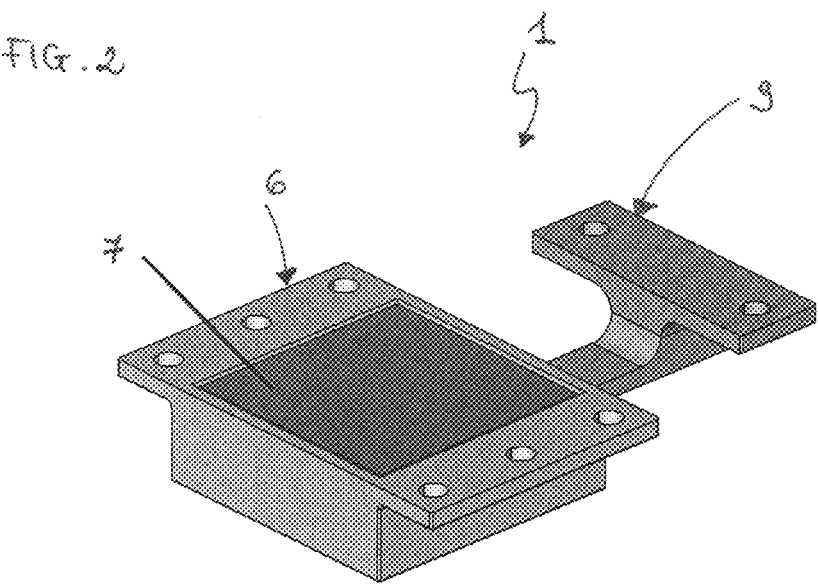
FIG. 2 illustrates the system of FIG. 1 overturned, in a perspective view.

Preferably, the sensor 5 is housed within a box-like casing 6, as can be seen in FIGS. 1 and 2. Optionally, the box-like casing 6 is provided with a magnetic deflector 7 positioned to cover the sensor 5 to shield it from undesired magnetic fields (e.g. environmental). In particular, by using a magnetic deflector 7 made with material having high magnetic permeability and low coercivity (e.g. Fe Si or permalloy), the flow of external magnetic fields is stopped. Furthermore, the magnetic deflector 7 brings about an extension of the measurement field.

The box-like casing 6 is equipped with a transparent plate 8 on which a grid is printed for reading the measurement.

Up to here a biaxial measurement system 1 has been described, since with a single sensor 5 it is possible to obtain the coordinates (x,y) of the magnet 3. By envisaging the use of a further sensor, it is possible to move onto a triaxial measurement system 1.

The magnet 3 is housed within a further box-like casing 9 having a first portion 10 adapted to be fixed to one of the structural parts 2a, and a second portion 11 free and adapted to slide with respect to the box-like casing 6 containing the sensor 5. For example, the further box-like casing 9 is made of plastic material.

Preferably, the first portion 10 and the second portion 11 consist of two arms having a rectilinear development and connected to each other. As can be seen from the figures, the two arms 10, 11 substantially define a "T" shape. In particular, the second portion 11 is configured to be inserted and to slide within a cavity 13 afforded in the box-like casing 6.

In a first embodiment, illustrated in FIGS. 1, 2 and 3, the second portion 11 is substantially a parallelepiped shape.

Figure 8:
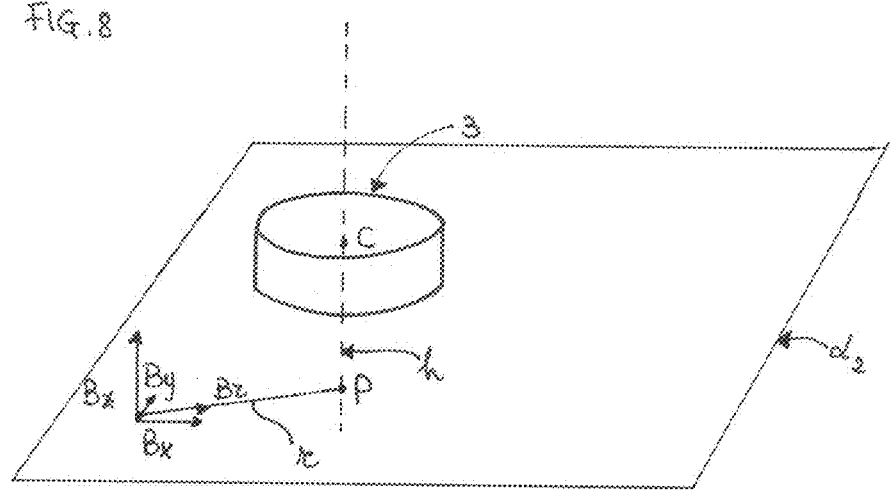
FIG. 8 illustrates the permanent magnet of FIG. 4 inserted in the reference sphere.
Figure 9:
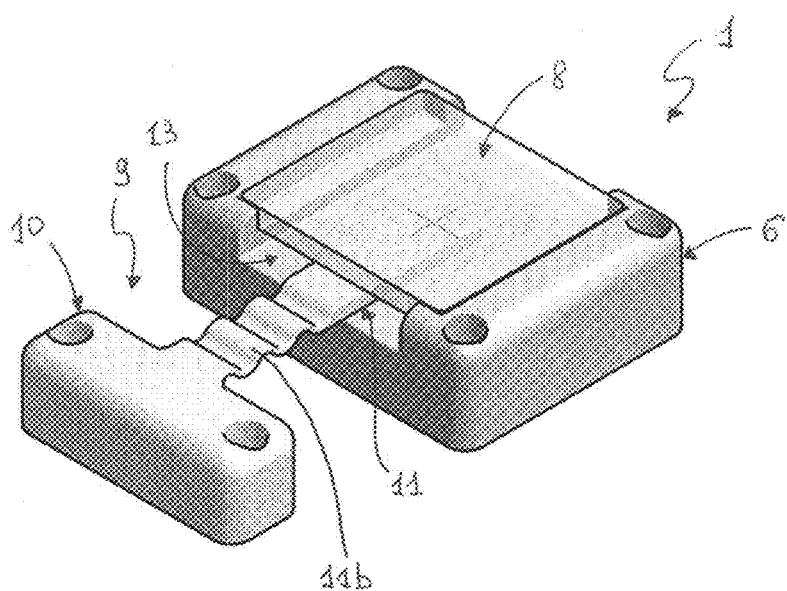
FIG. 9 illustrates a second embodiment of the measurement system of FIG. 1, in a perspective view.

In a second embodiment, illustrated in FIGS. 9 to 12, the second portion 11 has a first section 11a substantially having a parallelepiped shape and a second section 11b having an undulated progression. In other words, the second section 11b consists of a coil which enables the box-like casing 9 containing the magnet 3 to oscillate along the z axis (see the reference sphere of FIG. 8).

The second section 11b is directly connected to the first portion 10 while the first section 11a is slidably inserted in the cavity 13 afforded in the box-like casing 6.

Figure 11:
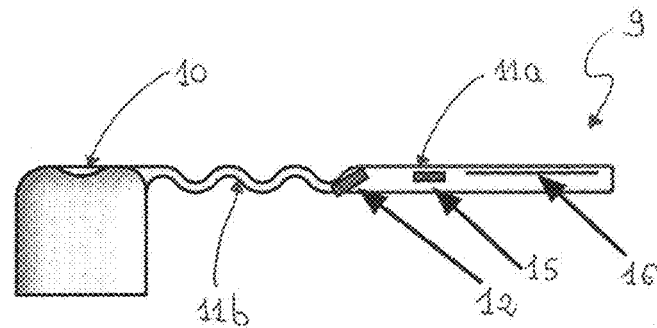
FIG. 11 illustrates the further box-like casing of the measurement system of FIG. 9, in a partially sectional lateral view.

Advantageously, the second section 11b has a lower thickness with respect to the thickness of the first section 11a, as can be seen in FIGS. 11 and 12. In other words, the second portion 11 becomes thinner closer to the connection with the first portion 10.

Advantageously, the measurement system 1 comprises a deformation sensor 12 which is integrally coupled to the further box-like casing 9. For example, the deformation sensor 12 is inserted within or fixed to the outside of the further box-like casing 9. Preferably, the deformation sensor 12 is at the second section 11b (coil) or the first section 11a. For example, the deformation sensor is a strain gauge of the known type.

In a wireless embodiment, the two casings 6, 9 comprise corresponding electronic management modules so as to make data processing and exchange possible. In particular, the box-like casing 9 is associated with a radiofrequency transreceiver 15 provided with an antenna 16, for the purpose of receiving the electric power supply and exchanging data with the corresponding electronic management module positioned within the box-like casing 6 containing the sensor 5. Preferably, the box-like casing 6 contains an accelerometer (not illustrated) which can read the vibrations to which such casing 6 is subject. In particular, the accelerometer is of the triaxial type, for example in MEMS technology.

The deformation sensor 12 may be supplied through wires or wireless, for example via radio.

Figure 10:
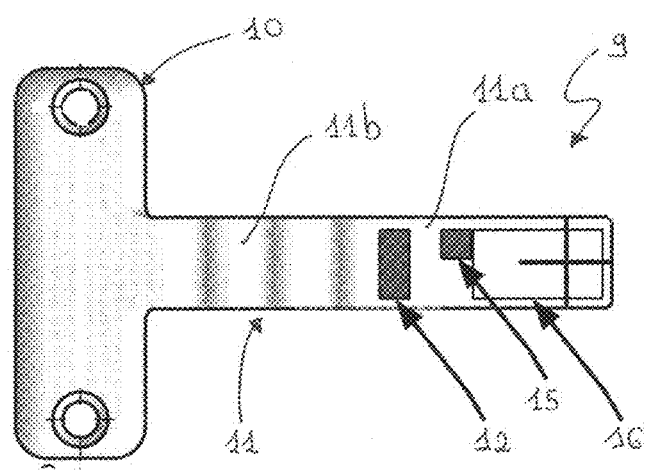
FIG. 10 illustrates a further box-like casing of the measurement system of FIG. 9, in a top view.

FIGS. 10 and 11 illustrate a possible spatial configuration for the deformation sensor 12, the transreceiver 15 and the antenna 16 within the further box-like casing 9.

From the description given, the characteristics of the measurement system of the relative position between the two separate structural parts, according to the present invention, are clear, as are the advantages.

In particular, the configuration and reciprocal pre-chosen movement for the sensor-magnet pair enables the sensor to be crossed by a magnetic flow that changes direction. In this way, the calculation of the relative position between the structural parts can be simply obtained through relationships between the radial and vertical component of the magnetic field flow.

Furthermore, a triaxial sensor is sufficient to univocally obtain the desired measurement, unlike what is envisaged by the prior art, which made use of two or more monoaxial sensors. Further to the advantages in terms of dimensions and costs, the use of a single sensor enables the compensation of the variations in measurements performed by a plurality of sensors to be avoided (for example, gain and temperature variations, etc.).

Furthermore, thanks to the fitting of the experimental data it is possible to improve the estimate of the distance and extend the measurement range with respect to solutions of the prior art.

Furthermore, the second embodiment is particularly advantageous since the coil enables the box-like casing containing the magnet to oscillate along the z axis. In this way, the measurement system proposed guarantees that precise measurements are obtained along (x,y) thanks to the rigidity of the structure, and is able to sustain non-planar deformations (i.e. along z) without breaking thanks to the oscillating coil.

Furthermore, the embodiment with a deformation sensor placed at the coil also enables the deformation along the z axis to be monitored, although roughly. The precision limitation is due to the fact that the coil absorbs a maximum deformation value before breaking. In fact, the oscillation of the coil enables a measurement of the deformation along the z axis to be detected and substantially signals that the sensor is still operating (i.e. that the coil is not broken).

Furthermore, the presence of the accelerometer in the box-like casing containing the sensor enables the vibration to be detected to which the corresponding structural part is subject, which is then correlated with variation, if any, in the crack.

The invention claimed is:

1. A measurement system (1) of the relative position between two separate structural parts (2a, 2b), comprising:
 a body (3) adapted to generate a magnetic field (B), said body (3) being applicable to one of said parts (2a);
 at least one sensor (5) applicable to the other of said parts (2b), said at least one sensor (5) being a triaxial Hall-effect sensor, said sensor (5) and said body (3) being relatively movable according to a direction perpendicular to the axis of symmetry (h) of the magnetic field (B) so that the direction of the lines of force of the magnetic field (B) that cross the sensor (5) varies, said sensor (5) being configured in order to detect three vector components (Bx, By, Bz) of the intensity of the magnetic field (B), characterised in that the system (1) further comprises a processing block of said three vector components (Bx, By, Bz) detected by said at least one sensor (5), said processing block being configured to calculate at least one radial component (Br) of the magnetic field (B) defined as follows:

$$Br = \sqrt{Bx^2 + By^2}$$

and to calculate the distance (r) from the axis of symmetry (h) from the formula:

$$r = \begin{cases} f1\left(\frac{Br}{Bz}\right) \text{if} \frac{Br}{Bz} \in [0, 1] \\ f2\left(\frac{Br}{Bz}\right) \text{otherwise} \end{cases}$$

wherein f1 and f2 are polynomials whose coefficients can be derived from the fitting of experimental data or potentially obtained through finite element simulations; the measurement system (1) further comprising a box-like casing (6) housing said at least one sensor (5), and a further box-like casing (9) having a first portion (10) adapted to be fixed to one of the structural parts (2a) and a second portion (11) free and adapted to slide with respect to the box-like casing (6) housing the sensor (5).

2. The measurement system (1) according to claim 1, wherein said at least one sensor (5) is fixed and the body (3) is movable with respect to it.

3. The measurement system (1) according to claim 2, wherein said magnet (3) can be moved according to a direction perpendicular to said axis of symmetry (h), while the sensor (5) is located on a plane (α2) perpendicular to said axis of symmetry (h) and not passing through the centre (C) of the magnet (3).

4. The measurement system (1) according to claim 1, wherein said magnetic field (B) has cylindrical symmetry.

5. The measurement system (1) according to claim 1, wherein said body (3) is a permanent magnet.

6. The measurement system (1) according to claim 1, further comprising a processing block of the three vector components (Bx, By, Bz) detected by said at least one sensor (5), said processing block being configured to calculate at least one radial component (Br) defined as follows:

$$Br = \sqrt{Bx^2 + By^2}$$

and to calculate the relative position from the arctan function $$\left(\frac{Br}{Bz}\right).$$

7. The measurement system (1) according to claim 1, wherein said first portion (10) and said second portion (11) consist of two arms having a rectilinear development and connected to each other, said second portion (11) being configured to be inserted and slide within a cavity (13) afforded in the box-like casing (6) housing the sensor (5).

8. The measurement system (1) according to claim 7, wherein said second portion (11) of the further box-like casing (9) has a first section (11a) substantially having a parallelepiped shape and a second section (11b) having an undulated progression.

9. The measurement system (1) according to claim 8, wherein said second portion (11b) has a lower thicknes with respect to the thickness of the first section (11a).

10. The measurement system (1) according to claim 9, further comprising a deformation sensor (12) placed at said second section (11b) or said first section (11a).

11. The measurement system (1) according to claim 1, wherein said box-like casing (6) is provided with a magnetic deflector (7) positioned to cover the sensor (5) to shield it from undesired magnetic fields.

12. The measurement system (1) according to claim 1, wherein said box-like casing (6) is equipped with a transparent plate (8) on which a grid is printed for reading the measurement.

13. The measurement system (1) according to claim 1, wherein said box-like casing (6) contains an accelerometer which can read the vibrations to which said casing (6) is subject.

14. The measurement system (1) according to claim 13, wherein said accelerometer is of the triaxial type.

* * * * *

UNITED STATES PATENT AND TRADEMARK OFFICE
CERTIFICATE OF CORRECTION

PATENT NO. : 9,562,791 B2
APPLICATION NO. : 14/434136
DATED : February 7, 2017
INVENTOR(S) : Lorenzo Chiesi It is certified that error appears in the above-identified patent and that said Letters Patent is hereby corrected as shown below:

In Column 7, Lines 15-20, in Claim 1, please delete:

"$$r = \begin{Bmatrix} f1\left(\dfrac{Br}{Bz}\right) \text{if} \dfrac{Br}{Bz} \in [0, 1] \\ f2\left(\dfrac{Br}{Bz}\right) \text{otherwise} \end{Bmatrix}$$"

And insert therefor:

--$$r = \begin{Bmatrix} f1\left(\dfrac{Br}{Bz}\right) if \dfrac{Br}{Bz} \in [0,1] \\ f2\left(\dfrac{Bz}{Br}\right) otherwise \end{Bmatrix}$$--

Signed and Sealed this
Second Day of May, 2017

Michelle K. Lee
*Director of the United States Patent and Trademark Office*